(12) United States Patent
Kimi et al.

(10) Patent No.: US 9,196,001 B2
(45) Date of Patent: Nov. 24, 2015

(54) VIRTUAL SHOPPING MALL MANAGEMENT SYSTEM

(75) Inventors: Mio Kimi, Tokyo (JP); Ken Okamoto, Tokyo (JP); Mikiko Mizumura, Tokyo (JP)

(73) Assignee: Rakuten, Inc., Tokyo (JP)

( * ) Notice: Subject to any disclaimer, the term of this patent is extended or adjusted under 35 U.S.C. 154(b) by 926 days.

(21) Appl. No.: 12/669,694

(22) PCT Filed: Jun. 30, 2008

(86) PCT No.: PCT/JP2008/061847
§ 371 (c)(1),
(2), (4) Date: Jun. 29, 2010

(87) PCT Pub. No.: WO2009/013973
PCT Pub. Date: Jan. 29, 2009

(65) Prior Publication Data
US 2010/0293066 A1    Nov. 18, 2010

(30) Foreign Application Priority Data

Jul. 20, 2007  (JP) .............................. P.2007-189325

(51) Int. Cl.
*G06Q 30/06*    (2012.01)
*G06Q 20/12*    (2012.01)

(52) U.S. Cl.
CPC ............ *G06Q 30/0603* (2013.01); *G06Q 20/12* (2013.01); *G06Q 30/0601* (2013.01); *G06Q 30/0635* (2013.01)

(58) Field of Classification Search
USPC ...................................................... 705/26, 27
IPC .................................................. G06Q 30/0635
See application file for complete search history.

(56) References Cited

U.S. PATENT DOCUMENTS

| 6,850,900 B1 | 2/2005 | Hare et al. |
| 2002/0055883 A1 | 5/2002 | Shiba et al. |

(Continued)

FOREIGN PATENT DOCUMENTS

JP    2002-24580 A    1/2002

(Continued)

OTHER PUBLICATIONS

"Oracle Delivers Oracle(R) Advanced Procurement Release 12; Latest Release Includes Unified Workcenter, Increased Support for Complex Procurement and Improved Supplier Management and Enablement," PR Newswire, Feb. 12, 2007, PQDialog #447253415, 5pgs.*

(Continued)

*Primary Examiner* — Rob Pond
(74) *Attorney, Agent, or Firm* — Sughrue Mion, PLLC

(57) ABSTRACT

The present provides a mechanism of leaving, as a record, a fact that a correction of order details of an accepted order is proper in virtual shopping mall service.
When modification of order details is received from a member store terminal 40 (S615), a virtual shopping mall management server 10 calculates the difference between an amount before the change and an amount after the change. When the difference is determined to be equal to or larger than a predetermined amount (Yes in S620), the server generates a settlement process request page and transmits it to the member store terminal 40 (S625a). When the settlement process request information is received from the member store terminal 40, the server transmits an e-mail requesting for approval on the change in the amount to a member terminal (S630a). When a response of approval or denial on the change in the amount is accepted from the member terminal on a selection page of approval/denial on the amount change (S635a), whether the change is approved or not is determined (S640a). When it is determined that the response from the member terminal is approval (Yes in S640a), the server determines that the modification in the order details is proper, fixes the change in the order details, and requests the bank to perform an account transfer process (S645a).

7 Claims, 13 Drawing Sheets

(56) References Cited

U.S. PATENT DOCUMENTS

| | | | |
|---|---|---|---|
| 2002/0123938 A1* | 9/2002 | Yu et al. ........................... | 705/26 |
| 2002/0152133 A1* | 10/2002 | King et al. ..................... | 705/26 |
| 2003/0158791 A1* | 8/2003 | Gilberto et al. ................ | 705/27 |
| 2003/0220863 A1 | 11/2003 | Holm et al. | |
| 2006/0235789 A1* | 10/2006 | Koch ............................. | 705/39 |
| 2007/0067223 A1 | 3/2007 | Shields | |

FOREIGN PATENT DOCUMENTS

| | | |
|---|---|---|
| JP | 2003-346020 A | 12/2003 |
| JP | 2004-164146 A | 6/2004 |
| JP | 2004-213378 A | 7/2004 |
| JP | 2001-222666 A | 8/2011 |
| TW | 200511080 A | 3/2005 |

OTHER PUBLICATIONS

Taiwanese Patent Office Action dated Oct. 4, 2012 for Taiwanese Application No. 097127174 and English-language translation thereof.

* cited by examiner

FIG.5

(a) MEMBER INFORMATION

| MEMBER ID |
|---|
| PASSWORD |
| MAIL ADDRESS |
| PERSONAL INFORMATION |

(b) MEMBER STORE INFORMATION

| MEMBER STORE ID (DOMAIN NAME) |
|---|
| AUTHENTICATION KEY |
| MAIL ADDRESS |
| ID OF PERSON IN CHARGE |
| STORE INFORMATION |

(c) PRODUCT INFORMATION

| PRODUCT CODE |
|---|
| NAME |
| UNIT PRICE |
| PRODUCT RELATED INFORMATION |

(d) ORDER INFORMATION

| ORDER NUMBER |
|---|
| ORDER DATE AND TIME |
| MEMBER ID |
| MEMBER STORE ID |
| PRODUCT CODE |
| QUANTITY |
| CHARGE AMOUNT |
| SETTLEMENT METHOD |
| ORDER RECEIVING PROCESS STATUS |
| SETTLEMENT PROCESS STATUS |
| MODIFICATION DATE AND TIME |
| MODIFIED AMOUNT |
| AMOUNT CHANGE APPROVAL FLAG |

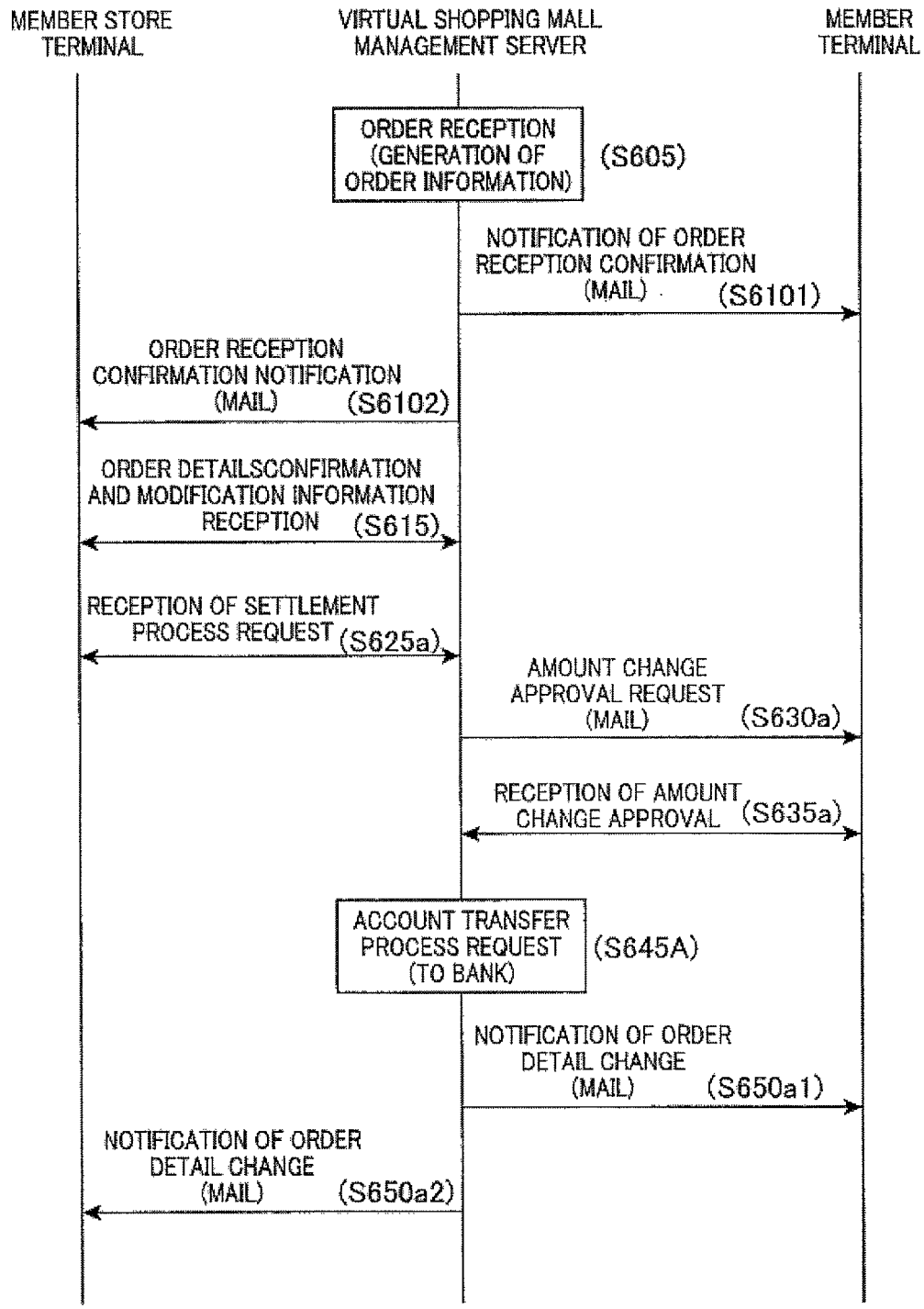

FIG. 8

MODIFICATION OF ORDER NUMBER 123456-20070601-123456

* PLEASE MAKE SURE:
■ IN THE CASE OF MODIFYING THE QUANTITY, PRODUCT NAME, ITEM, OPTION, AND THE LIKE ON AN AVAILABLE PRODUCT, STOCK OF THE PRODUCT OR STOCK BY ITEM OPTION IS NOT UPDATED.
■ IF YOU MAKE AN ORDER CHANGE ACCOMPANYING A CHARGE AMOUNT CHANGE, WE WILL SEND A CONFIRMATION MAIL TO YOU ON THE FOLLOWING DAY OF THE PROCESS.

■ CORRECTION IN DELIVERY ADDRESS, ORDERED PRODUCT, AND AMOUNT

| DELIVERY ADDRESS NO. | NAME | FURIGANA (OTHER TYPE OF CHARACTERS) | ADDRESS | | | TELEPHONE NUMBER | | |
|---|---|---|---|---|---|---|---|---|
| 1 | ○○ ○○ | ○○ ○○ | 〒*-** | ○○○ ○○○○ | ○○○○ | ** | **** | **** |

| DELIVERY ADDRESS | GIFT WRAPPING PAPER | PRODUCT | ITEM/OPTION | UNIT PRICE | QUANTITY | SUBTOTAL | TAX | SHIPPING CHARGE |
|---|---|---|---|---|---|---|---|---|
| 1 | ○○○○ | | | 1,980 | 1 | 1,980YEN | INCLUDED ☐ | INCLUDED ☐ |
| | | | ☑ CONSUMPTION TAX RE-CALCULATION | TOTAL | | 1,980YEN | 0 | 0 |
| | | | | CHARGE AMOUNT | | | | 1,980YEN |

[ STORE THIS INFORMATION ]    [ ADD LAPPING ]

INDIVIDUAL XXX SETTLEMENT PROCESS

THIS IS PRESENT STATUS. BY CLICKING EXECUTION BUTTONS, YOU CAN PERFORM XXX SETTLEMENT PROCESS.

910a  920a — REQUEST FOR ACCOUNT TRANSFER

| ORDER NUMBER | 123456-20070001-123456 |
|---|---|
| AMOUNT CONFIRMATION TO USER | ↳ ¥ |
| SETTLEMENT PROCESS STATUS | WAITING FOR TRANSFER REQUEST |

INDIVIDUAL XXX SETTLEMENT PROCESS

THIS IS PRESENT STATUS. BY CLICKING EXECUTION BUTTONS, YOU CAN PERFORM XXX SETTLEMENT PROCESS.

910b  920b — REQUEST FOR ACCOUNT TRANSFER

| ORDER NUMBER | 123456-20070001-123456 |
|---|---|
| AMOUNT CONFIRMATION TO USER | |
| SETTLEMENT PROCESS STATUS | WAITING FOR TRANSFER REQUEST |

DETAILS OF PURCHASE HISTORY — 1100

1130 — CONFIRM SETTLEMENT AMOUNT

1110

PLEASE DIRECTLY ASK THE SHOP FOR AN ORDER CHANGE.

| DELIVERY ADDRESS | PRODUCT NAME | UNIT PRICE | QUANTITY | SUBTOTAL | TAX | SHIPPING COST |
|---|---|---|---|---|---|---|
| ○○ ○○ ○○○ ○○○○○ ··· | ●●●● | 1,980 YEN | 2 | 3,960 YEN | INCLUDED | INCLUDED |
| | | | TOTAL | 3,960 YEN | 0 YEN | 0 YEN |
| | | | INCLUSIVE SUM | | | 3,960 YEN |

THE INCLUSIVE SUM IS SUBJECT TO CHANGE DUE TO DELIVERY SITUATION AND THE LIKE.

1120

| ORDER RECEPTION NUMBER | 123456-2007-123456 |
|---|---|
| PURCHASE DATE AND TIME | JUNE 1, 2007, 14:48:13 |
| ORDERED PERSON | ○○ ○○<br>○○○ ○○○○○ ···· |
| PAYMENT METHOD | XXX SETTLEMENT |
| DELIVERY METHOD | DOOR-TO-DOOR DELIVERY SERVICE |
| REMARKS | REMARKS |

ATTENTION! AMOUNT IS CHANGED BY ORDER CORRECTION.

PLEASE CONFIRM THE FOLLOWING AMOUNT AND SELECT "APPROVAL" OR "CANCEL".

1210

| AMOUNT UPON ORDER | 1,980 YEN |
|---|---|
| AMOUNT AFTER CHANGE | 3,960 YEN |
| DIFFERENCE | + 1,980 YEN |

1220a — APPROVAL ON AMOUNT        CANCEL — 1220b

VIRTUAL SHOPPING MALL MANAGEMENT SYSTEM

TECHNICAL FIELD

The invention relates to a system for supporting sales transaction works of business operators selling products via a network and, more particularly, to modification of order details in a system of managing/running a virtual shopping mall.

BACKGROUND ART

In the case of buying/selling a product or the like via a network, people often use a virtual shopping mall as a system supporting sales transactions.

In a transaction using a virtual shopping mall, in the case of making an order and, after that, modifying the order (before completion of settlement) between parties of the transaction (seller and purchaser), usually, direct negotiation is performed between the parties of the transaction by telephone, a mail, or the like. A virtual shopping mall management system which manages and runs the virtual shopping mall is not involved.

CONVENTIONAL CASE

The flow of processes performed in the case where an order is accepted and, after that, modified in a conventional virtual shopping mall management system will be described with reference to FIGS. 1 to 3.

(1) Configuration of Conventional System

FIG. 1 illustrates a configuration of a conventional system that manages and runs a virtual shopping mall.

As shown in FIG. 1, a conventional system includes a virtual shopping mall management server 10 that manages a virtual shopping mall in an integrated manner, a terminal 30 of a member of the virtual shopping mall connected to the virtual shopping mall management server 10 via a network 20 such as the Internet, and a terminal 40 of a member store of the virtual shopping mall. Each of the member terminal 30 and the member store terminal 40 has a browser and can receive service from the virtual shopping mall management server 10 via the network 20.

(2) Order Accepting Process by Conventional System

Next, the flow of processes performed in the case of accepting an order for a product by a conventional system will be described by using the sequence chart of FIG. 2.

As shown in FIG. 2, first, the virtual shopping mall management server 10 transmits a product selection page to the member terminal 30 and makes a member select a product to be ordered (S205). The member selects a product to be ordered on the selection page.

When a product is selected on the selection page, the virtual shopping mall management server 10 transmits a login page to the member terminal 30 and authenticates the member as a customer (S210). The member enters ID, password, and the like on the login page and is authenticated.

When the purchaser of the product is not registered yet, a member registration information entry page is transmitted to the member terminal 30 and the purchaser is requested to do member registration.

After the member authentication using the login page is completed, the virtual shopping mall management server 10 transmits a settlement method selection page to the member terminal 30 and makes the member select a settlement method (S215). The member selects a settlement method (for example, bank transfer, cash on delivery, credit card, or the like) on the selection page.

When the settlement method is selected on the selection page, the virtual shopping mall management server 10 transmits an order details confirmation page to the member terminal 30 to ask the member to confirm the order details (S220). The member checks if there is a mistake in the order details displayed on the confirmation page.

When the order details are confirmed on the confirmation page, the virtual shopping mall management server 10 transmits an order completion page to the member terminal 30 and presents acceptance of the order together with order number and the like to the member (S225).

(3) Process of Changing Order Details by Conventional System

Next, the flow of processes performed in the case of correcting order details after acceptance of the order in the conventional system will be described with reference to the sequence chart of FIG. 3.

The sequence chart of FIG. 3 shows processes performed after the product is ordered by the processes shown in FIG. 2.

As shown in FIG. 3, the virtual shopping mall management server 10 performs a process of accepting an order on the basis of information of the selected product and the like (S305). In this case, predetermined order information is generated for each order number (number given in S225 in FIG. 2) and stored in a predetermined database.

After completion of the order accepting process, the virtual shopping mall management server 10 transmits a confirmation mail indicative of acceptance of the order to the member terminal 30 and the member store terminal 40, and notifies the member (purchaser) and the member store (seller) of acceptance of the order (S310 and S315). E-mails to the member terminal 30 and the member store 40 are transmitted almost at the same time.

On receipt of the notification, the member store (person in charge) logs in the virtual shopping mall management server 10 using the member store terminal 40 and requests for an order details confirmation page. When the confirmation page is requested from the member store terminal 40, the virtual shopping mall management server 10 transmits an order details confirmation page to the member store terminal 40 and requests the member store to confirm the order details (S320). The member store (person in charge) confirms the order details in the received order details confirmation page.

After that, in the case where the order details (amount of money) change for some reason, direct negotiation is made by telephone, mail, or the like between the member store (person in charge) and the member without involving the virtual shopping mall management server 10 (S325). The direct negotiation is triggered by either a situation on the member store side (for example, addition of predetermined shipping charge) or a situation on the member side (addition of lapping, a change in the number of products ordered).

When the details of a change (changed amount of money) are determined by the direct negotiation, the member store (person in charge) logs in the virtual shopping mall management server 10 by using the member store terminal 40, and requests for an order details (amount of money) change page. When the correction page is requested from the member store terminal 40, the virtual shopping mall management server 10 transmits the order details correction page to the member store terminal 40, and receives the correction of the order details (amount of money) from the member store terminal 40 (S330).

When the correction of the order details (amount of money) is accepted, the virtual shopping mall management server 10 performs an order details changing process (S335). In this case, the accepted change is reflected as it is in the order information generated by the order accepting process (S305).

After completion of the order details changing process, the virtual shopping mall management server 10 transmits an E-mail indicative of the change in the order details to each of the member terminal 30 and the member store terminal 40 and notifies the member and the member store of the change in the order tails (S340 and S345). The E-mails to the member terminal 30 and the member store terminal 40 are transmitted almost simultaneously.

When the processes are completed, the accepted order can be settled with the changed amount of money. After that, the settlement of money is performed by the method selected in the settlement method selecting process between the member and the member store (S215 in FIG. 2).

(4) Problems in Conventional System

In a transaction using a virtual shopping mall, in the case of correcting order details after acceptance of an order, a method of direct negotiation by telephone, mail, or the like between parties of the transaction is employed. Consequently, even in the case where the charged amount increases largely, a process of correcting order details is not recorded in a system managing/running the virtual shopping mall. Such a situation often causes a trouble related to transaction details between parties of a transaction.

Especially, in the case where a settlement method which is made via a settlement company and in which a member (purchaser) is not actively involved in payment of money (for example, a credit card) is selected in the settlement method selecting process (S215 in FIG. 2), the member does not have a chance to select suspension or refusal of payment of money. Consequently, when the settlement is made with the corrected amount of money, there is the possibility that the member who purchased the product suffers an unreasonable loss.

DISCLOSURE OF THE INVENTION

Problem to be Solved by the Invention

An object of the invention is to provide a system of recording the fact that a correction of order details of an accepted order is proper in virtual shopping mall service.

Means for Solving Problem

To achieve the object, the invention provides a virtual shopping mall management system for supporting a transaction between a member store in a virtual shopping mall and a member and performing a process of modifying order information, which includes a modified information receiving unit that receives modified information on the order information from a terminal of the member store; a change approval request mail transmitting unit, when it is determined on the basis of the modified information that a change exceeding a predetermined amount occurs in a charge amount, that transmits an electronic mail for requesting approval on the change exceeding the predetermined amount to a terminal of the member; an approval/disapproval information receiving unit that receives approval information or disapproval information on the change exceeding the predetermined amount from the terminal of the member; and an order determining unit that determines modification of the order information when the approval/disapproval information receiving unit receives approval information, and cancels the order information when the approval/disapproval information receiving unit receives disapproval information.

When the approval/disapproval information receiving unit does not receive approval information or disapproval information within the predetermined period, the order determining unit may cancel the order information.

When the approval/disapproval information receiving unit does not receive approval information or disapproval information within the predetermined period, the change approval request mail transmitting unit may re-transmit the electronic mail for requesting approval on the change exceeding the predetermined amount to the terminal of the member.

The virtual shopping mall management system may further include a settlement process requesting unit that requests a predetermined settlement institute to perform a settlement process related to the transaction when the order determining unit determines modification of the order information.

The invention provides a virtual shopping mall management system for supporting a transaction between a member store in a virtual shopping mall and a member and performing a process of modifying order information, which includes a modified information receiving step that receives modified information on the order information from a terminal of the member store; a change approval request mail transmitting step, when it is determined on the basis of the modified information that a change exceeding a predetermined amount occurs in a charge amount, that transmits an electronic mail for requesting approval on the change exceeding the predetermined amount to a terminal of the member; an approval/disapproval information receiving step that receives approval information or disapproval information on the change exceeding the predetermined amount from the terminal of the member; and an order determining step that determines modification of the order information when the approval/disapproval information receiving unit receives approval information, and cancels the order information when the approval/disapproval information receiving unit receives disapproval information.

The invention also provides a program for making a computer function as each of the units of the virtual shopping mall management system.

Effect of the Invention

In the virtual shopping mall management system of the invention, for a modification of order details causing a large change in a charge amount, approval of a purchaser is required. Consequently, information that the modification in the order details is approved by the purchaser can be left as a record.

As a result, a trouble related to a transaction between parties of the transaction can be prevented. Even if a trouble occurs in reality, by using the record, a situation which is out of control can be avoided.

BRIEF DESCRIPTION OF THE DRAWINGS

FIG. 5 is a diagram showing main items of (a) member information, (b) member store information, (c) product information, and (d) order information.

FIG. 6 is a sequence chart showing the flow of processes performed in the case where an order change causing a large change in a charged amount of money is made and the member is requested to approve the amount change in a system of the embodiment.

FIG. 8 is a diagram showing an example of an order detail correction page.

FIG. 9A is a diagram showing an example of a settlement process request page transmitted to a member store terminal when it is determined that the difference between the amount before a change and the amount after the change is equal to or larger than a predetermined amount of money, and FIG. 9B is a diagram showing an example of a settlement process request page transmitted to the member store terminal when the difference between the amount before a change and the amount after the change is not equal to or larger than the predetermined amount.

FIG. 11 is a diagram showing an example of a purchase history confirmation page.

FIG. 12 is a diagram showing an example of a page of selecting approval or disapproval for a change in amount of money.

DESCRIPTION OF REFERENCE NUMERALS

Figure 1:
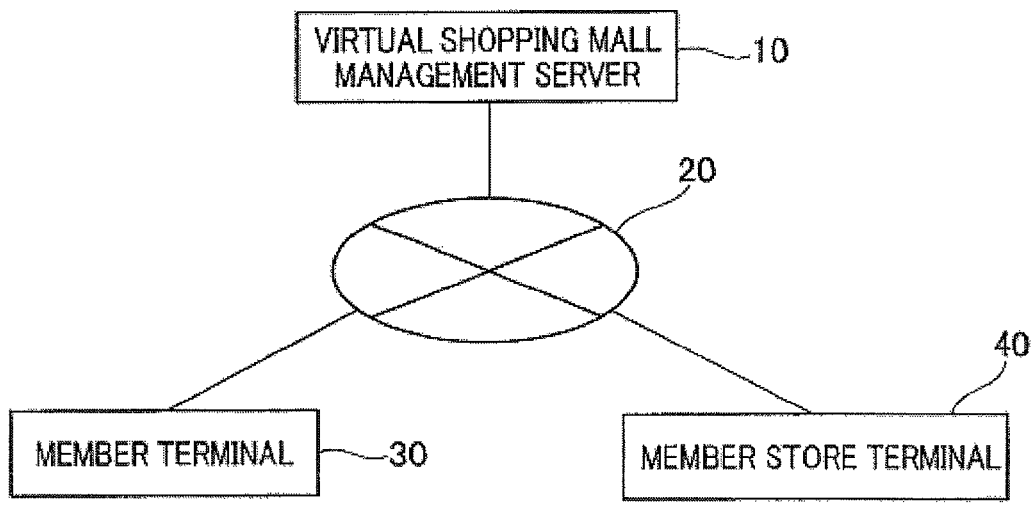
FIG. 1 is a diagram showing a configuration example of a conventional system.

10 virtual shopping mall management server
11 member information database
12 member store information database
13 product information database
14 order information database
20 network
21 dedicated line
30 member terminal
40 member store terminal
50 bank server
800 order details correction page
900a settlement process request page which is transmitted when it is determined that the difference between an amount before a change and an amount after the change is equal to or larger than a predetermined amount
900b settlement process request page which is transmitted when it is determined that the difference between an amount before a change and an amount after the change is not equal to or larger than the predetermined amount
1000 mail of requesting approval for a change in amount
1100 purchase history confirmation page
1200 page of selecting approval or disapproval for a change in amount
1300 mail of requesting approval for a change in amount (for a mobile terminal)
1400 purchase history confirmation page (for a mobile terminal)
1500 page of selecting approval or disapproval for a change in amount (for a mobile terminal)

BEST MODE FOR CARRYING OUT THE INVENTION

An example of an embodiment of the invention will be described below with reference to FIGS. 4 to 12.

A system of the embodiment requires approval of a purchaser of a product on modification of order details accompanying large increase in amount of money charged.

As a precondition, targets of virtual shopping mall service provided by the system of the embodiment are transactions performed between the user (member) who registered to use the service and a store (member store) which registered as a store. This is an example of operation and the transaction as the target of service may be enlarged (for example, a transaction with an unregistered user as a party in charge).

The following description uses an example of the case where a change in order details (charged amount) is determined and, after that, a member makes settlement by an account transfer via a bank at which the member has an account. The account transfer is a settlement method performed via a settlement institute (bank), and corresponds to a settlement method "in which a member (purchaser) is not actively involved in payment of money" from the viewpoint that payment is automatically debited from the account of the member after a transaction is done.

In the embodiment, a settlement method of debiting money for payment from a bank account of a member (purchaser) and paying the money to a bank account of a member store (purchaser) is called "account transfer".

<Description of Embodiment>
(1. Configuration of System of the Embodiment)
The configuration of a system of the embodiment will be described with reference to FIGS. 4 and 5(*a*) to 5(*d*).

The configuration of the system of the embodiment is basically similar to that of the conventional system shown in FIG. 1 except for the point that a server of a bank is added. A database constructed in a virtual shopping mall management server will be described in detail.

(1-1. Virtual Shopping Mall Management Server)
In FIG. 4, the virtual shopping mall management server 10 is a server that manages from acceptance of an order to completion of a transaction in an integrated manner. A necessary part in the system of the embodiment will be described.

(1-2. Member Information Database)
In FIG. 4, a member information database 11 is a database that stores information of a user (hereinbelow, called "member information") who purchases a product by using service provided by the system of the embodiment. Only a necessary part in the system of the embodiment will be described.

Although the member information database 11 is constructed in a storage built in the virtual shopping mall management server 10 in the embodiment, it may be constructed in another independent storage as long as stored information can be read.

FIG. 5(*a*) shows main items of the member information database 11.

In FIG. 5(*a*), "member ID" is identification information unique to a member registered for use. "Password" is a password used for authenticating the member. "Mail address" is a mail address of the member terminal 30 (which will be described later) used by the member. "Personal information"

is personal information (for example, name, sex, address, telephone number, and the like) of the member.

In addition, authentication (login) of the member, "member ID" and "password" in the items of the member information are used.

(1-3. Member Store Information Database)

Referring again to FIG. 4, a member store information database 12 is a database that stores information of a store (hereinbelow, called "member store information") which is open in service provided by the system of the embodiment and sells products. Only a necessary part of the system of the embodiment will be described.

Although the member store information database 12 is constructed in a storage built in the virtual shopping mall management server 10 in the embodiment, it may be constructed in another independent storage as long as stored information can be read.

FIG. 5(b) shows main items of the main store information database 12.

In FIG. 5(b), "member store ID" is identification information unique to a registered store. In the embodiment, as member store ID, the domain name of the member store is used. "Authentication key" is a key used for authenticating the member store. "Mail address" is a mail address of the member store terminal 40 (which will be described later) used by the member store. "Person-in-charge ID" is identification information of a person in charge of order acceptance management work in the member store. At least one "person-in charge ID" is registered. "Store information" is information of the member store (for example, the name, URL of a web page describing the details of the store, and the like).

For authentication (log in) of a member store, "member store ID", "person-in-charge ID", and "authentication key" in the items of the member store information are used.

(1-4. Product Information Database)

Referring again to FIG. 4, a product information database 13 is a database that stores information of a product (hereinbelow, called "product information") which is used in service provided by the system of the embodiment. Only a necessary part of the system of the embodiment will be described.

Although the product information database 13 is constructed in a storage built in the virtual shopping mall management server 10 in the embodiment, it may be constructed in another independent storage as long as stored information can be read.

FIG. 5(c) shows main items of the product information database 13.

In FIG. 5(c), "product code" is identification information unique to a product dealt in service provided by the system of the embodiment. "Name" is the name of the product. "Unit price" is a price per unit which is set for the product. "Product-related information" is information related to the product (for example, ID of a store which deals the product (member store ID), and the like).

(1-5. Order Information Database)

Referring again to FIG. 4, an order information database 14 is a database that stores information of an order (hereinbelow, called "order information") accepted in the service provided by the system of the embodiment. Only a necessary part related to the system of the embodiment will be described.

The "order information" is associated with "member information", "member store information", and "product information".

Although the order information database 14 is constructed in a storage built in the virtual shopping mall management server 10 in the embodiment, it may be constructed in another independent storage as long as stored information can be read.

FIG. 5(d) shows main items of the order information database 14.

In FIG. 5(d), "order number" is identification information unique to an order using service provided by the system of the embodiment. "Order date and time" is date and time on which the order is accepted. "Member ID" is identification information of a member who placed the order, and the order information is associated with member information. "Member store ID" is identification information of a member store which has accepted the order, and the order information is associated with the member store information.

Similarly, in FIG. 5(d), "product code" is identification information of a product related to the order, and product information is associated with the order information. "Quantity" is the number of products ordered. "Charged amount" is a total value of amount charged in the order. "Settlement method" is a settlement method of the order (for example, bank transfer, cash on delivery, credit card, account transfer, or the like). "Accepting process status" is a status indicative of a progress situation of a process of accepting the order (for example, "new acceptance", "waiting for shipping", "completion", "cancellation", and the like). The "settlement process status" is a status indicative of a progress situation of a process of settling the product (for example, "unprocessed", "waiting for transfer request", "unapproved", "balance confirming", "payment preparing", "transfer impossible", "completion", "payment impossible", and the like). In the embodiment, the initial value of the "accepting process status is set as "new acceptance", and the initial value of the "settlement process status" is set as "unprocessed".

Similarly, in FIG. 5(d), "modification date and time" is date and time on which the order information is modified. "Modified amount" is a corrected charged amount of the order information. "Amount change approval flag" is a flag indicating whether approval is obtained from a member for the amount change or not.

The "modification date and time", "modified amount", and "amount change approval flag" are items provided only in the case where modification of order details is accepted. When there is no modification, those items are not provided. In the case where order details are modified a plurality of times, "modification date and time", "modified amount", and "amount change approval flag" are provided for each of the modifications.

(1-6. Member Terminal)

Referring again to FIG. 4, the member terminal 30 is a terminal used by the user (member) who purchases a product by using service provided by the system of the embodiment. In the embodiment, for example, the member terminal 30 is a terminal having a communication function such as a personal computer, a cellular phone, or the like.

The member terminal 30 has a browser. By connecting the member terminal 30 to the virtual shopping mall management server 10 via the network 20 such as the Internet, a product can be ordered from an arbitrary member store via the system of the embodiment.

(1-7. Member Store Terminal)

The member store terminal 40 is a terminal used by a store (member store) which sells products by using the service provided by the system of the embodiment. In the embodiment, the member store terminal 40 is, for example, a terminal having a communication function such as a personal computer, a cellular phone, or the like.

The member store terminal 40 has a browser. By connecting the member store terminal 40 to the virtual shopping mall management server 10 via the network 20 such as the Internet, a product can be managed via the system of the embodiment.

(1-8. Bank Server)

A bank server 50 is a server of a bank which performs a process of settlement by account transfer in the system of the embodiment. The bank server 50 is connected to the virtual shopping mall management server 10 via a dedicated line 21, and aligned with the virtual shopping mall management server 10 with respect to the settlement process. Between the bank server 50 and the virtual shopping mall management server 10, data is ciphered and ciphered data is transmitted/received.

In the embodiment, the virtual shopping mall management server 10 and the bank server 50 are connected to each other via the dedicated line 21. As long as data can be safely transmitted/received by ciphering or the like, they may be connected to each other via the network 20 such as the Internet.

(2. Flow of Processes in System of the Embodiment)

The flow of processes performed in the case where a modification is performed on order details causing a large change in a charged amount in the system of the embodiment will be described by using the sequence chart of FIG. 6.

Figure 3:
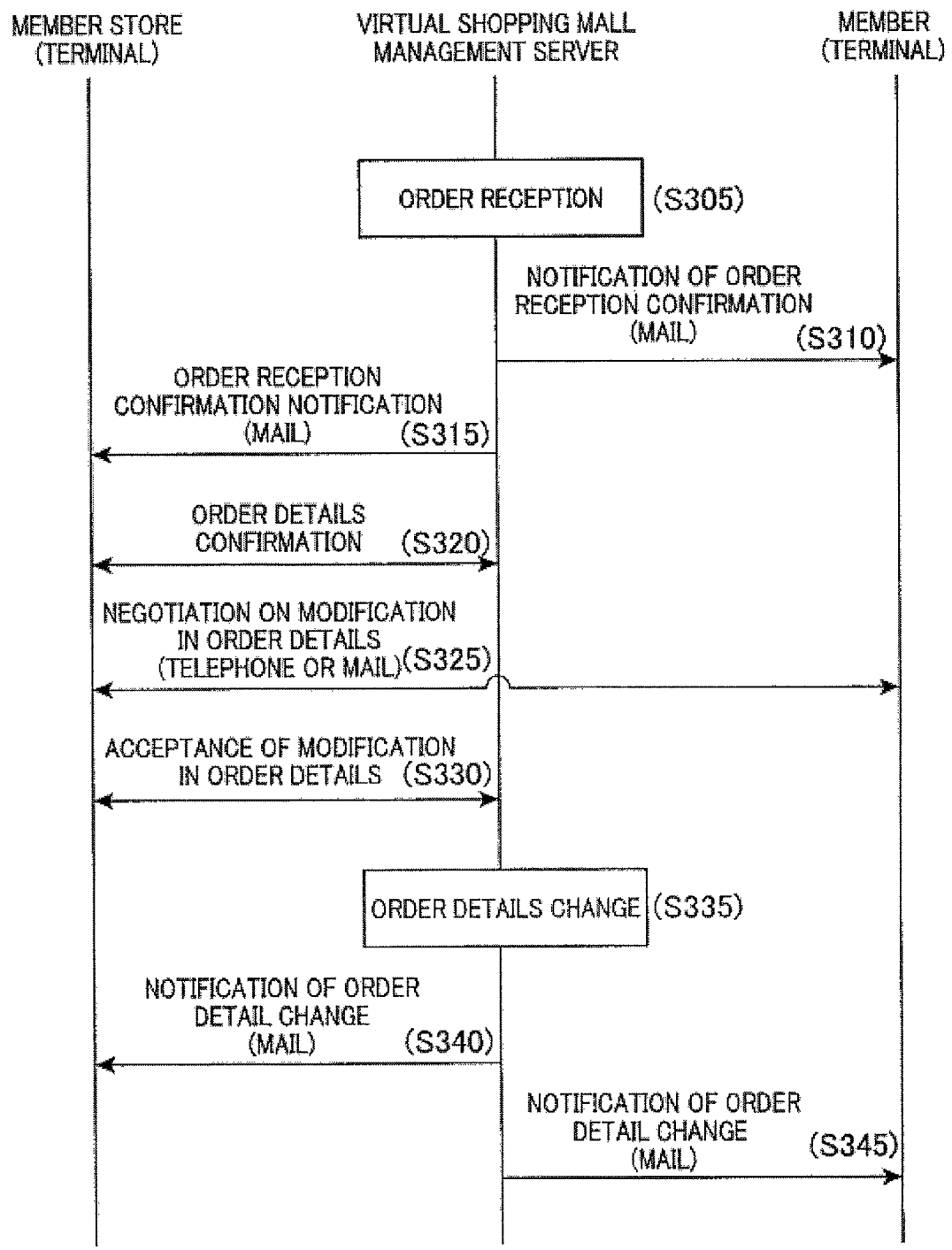
FIG. 3 is a sequence chart showing the flow of processes performed in the case of correcting order details of an accepted order in the conventional system.
Figure 4:
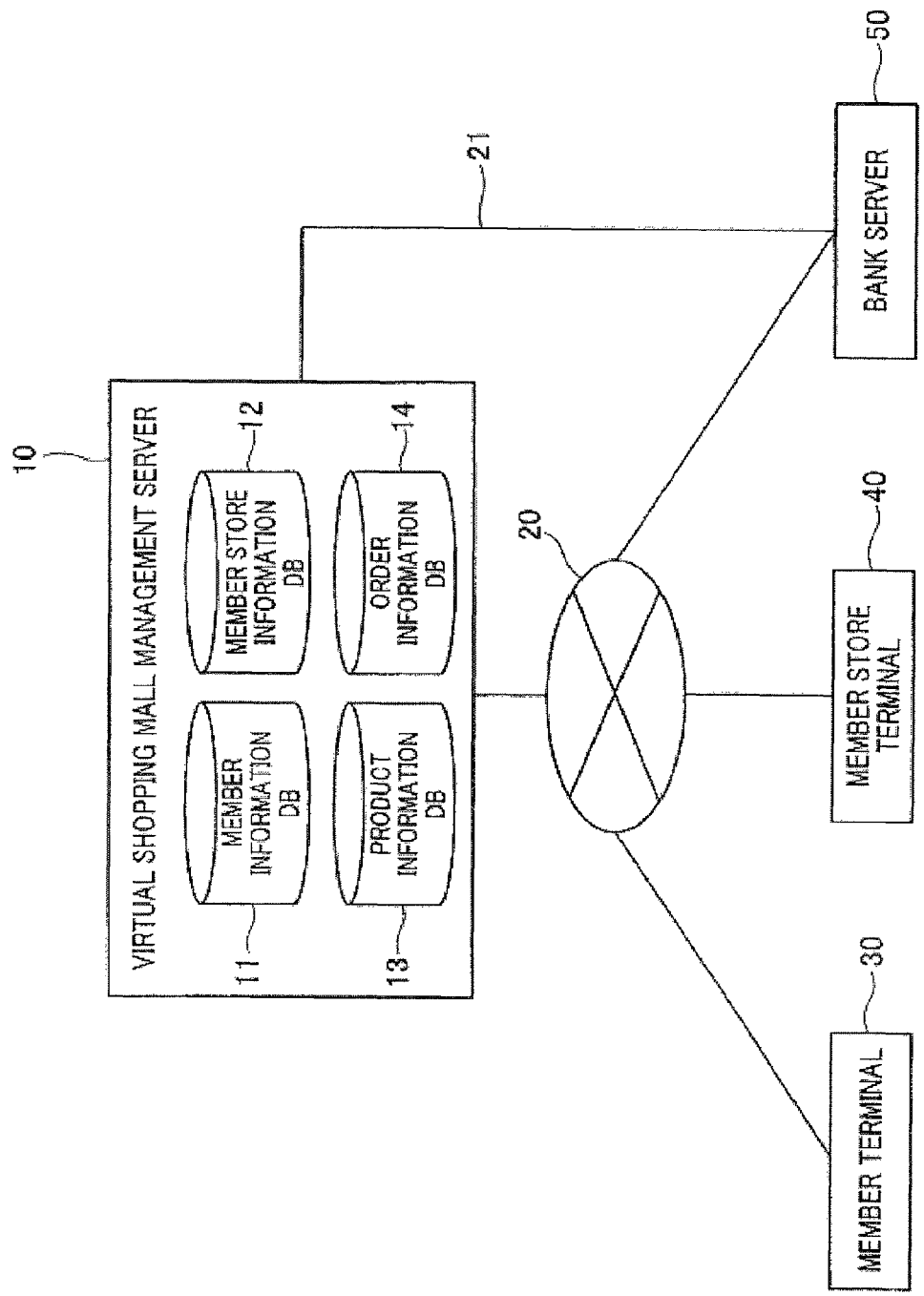
FIG. 4 is a diagram showing a configuration example of the system of an embodiment of the invention.

An order details modifying process performed by the system of the embodiment differs from the process of the conventional system shown in FIG. 3 mainly with respect to the following two points.

(a) In the system of the embodiment, when a modification on order details causing a large increase in a charged amount is accepted from a member store after acceptance of an order, a member who placed the order is asked for approval (S630*a* to S635*a*).

(b) In the system of the embodiment, after a request of a settlement (account transfer) process is accepted from a member store, the member is requested to approve the request. When the approval is obtained from the member, the settlement (account transfer) process is started without reconfirming the member store (S625*a* to S645*a*).

Figure 2:
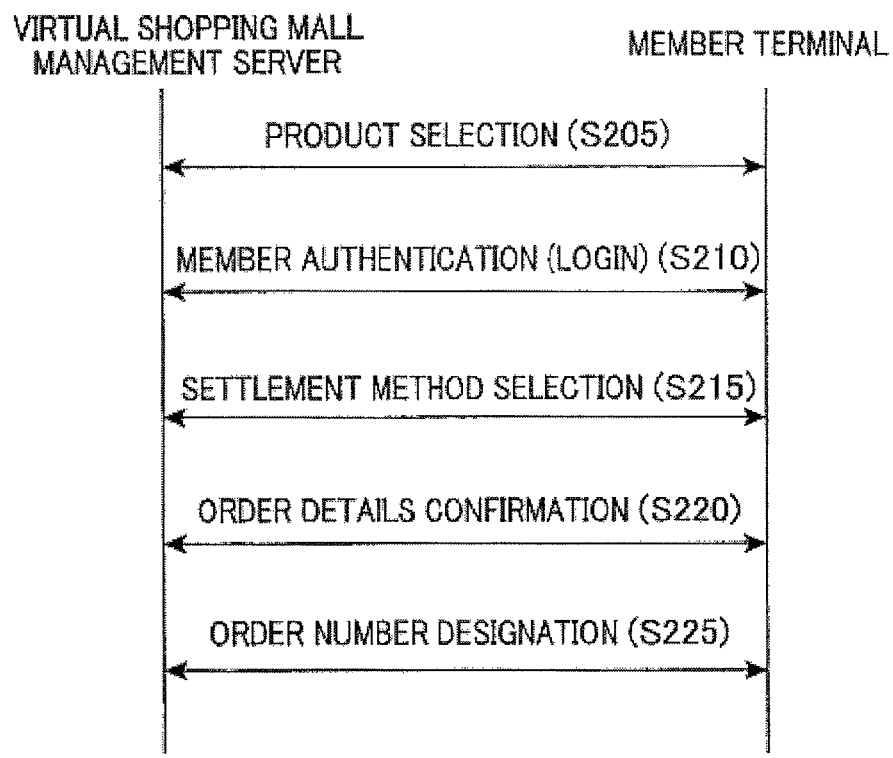
FIG. 2 is a sequence chart showing the flow of processes performed in the case of accepting an order for a product via a conventional system.

The sequence charge of FIG. 6 shows the processes performed after a product is ordered by the processes shown in FIG. 2. It is assumed that the account transfer is selected in the settlement method selecting process (S215 in FIG. 2).

(2-1. Acceptance of Order)

As shown in FIG. 6, the virtual shopping mall management server 10 performs a process of accepting an order on the basis of information of a selected product and the like (S605). In this case, order information (refer to FIG. 5D) is generated for each order number (number given in S225 in FIG. 2) and stored in the order information database 14.

On completion of the order accepting process, the virtual shopping mall management server 10 transmits a confirmation mail indicative of acceptance of an order to the member terminal 30 and the member store terminal 40 and notifies the member and the member store of acceptance of the order (S6101 and S6102).

(2-2. Acceptance of Modification)

When the notification is received, the member store (person in charge) logs in the virtual shopping mall management server 10 by using the member store terminal 40, and requests for an order details confirmation page. When the confirmation page is requested by the member store terminal 40, the virtual shopping mall management server 10 transmits the order details confirmation page to the member store terminal 40 and asks the member store to confirm the order details. The member store (person in charge) confirms the order details on the confirmation page and, as necessary, requests for a modification page from the confirmation page.

When the modification page is requested from the member store terminal 40, the virtual shopping mall management server 10 transmits the order details modification page to the member store terminal 40, and accepts the order details modification information from the member store terminal 40 (S615). The member store (person in charge) enters a necessary modification in the modification page.

There is a case that, before acceptance of modification of order details, in a manner similar to the conventional technique (S325 in FIG. 3), direct negotiation is made by telephone, mail, or the like between the member store (person in charge) and the member for the following reason. As described above, various triggers (a situation on the member store side and a situation on the member side) are considered for modification of order details causing a large change in the charged amount.

(2-3. Acceptance of Request for Settlement Process)

On receipt of order details modification information, the virtual shopping mall management server 10 transmits a settlement process request page to the member store terminal 40 and asks the member store (person in charge) for a request for a settlement process (account transfer process in the embodiment) with the modified amount (S625*a*). The member store (person in charge) requests for a settlement (account transfer) process with the modified amount from the received settlement process request page.

In the system of the embodiment, when the settlement process request is received from a member store, a process for obtaining approval of a member is performed. Consequently, when modification is made in order details causing a large change in an amount to be charged, the system asks the member store for a request for the settlement process with the modified amount without exception.

(2-4. Request for Approval)

When the request for the settlement process with the modified amount is received from the member store terminal 40, the virtual shopping mall management server 10 transmits an e-mail indicative of acceptance of modification in order details causing a large change in the amount to be charged to the member terminal 30, and requests the member to approve the change in the amount (S630*a*).

The member who received the request logs in the virtual shopping mall management server 10 by using the member terminal 30 and requests for a purchase history confirmation page. On receipt of the request for the confirmation page from the member terminal 30, the virtual shopping mall management server 10 transmits the purchase history confirmation page to the member terminal 30 and demands the member to respond whether the change in the amount is approved or not (S635*a*). The member confirms the modification on the purchase history confirmation page and responds whether the change in the amount is approved or not.

(2-5. Start of Order Details Changing/Settling Process)

When a response of approval on the change in the amount is received from the member terminal 30, the virtual shopping mall management server 10 receives the confirmation from the member, determines the change in the order details, and requests the bank server 50 to perform a predetermined account transfer process (S645*a*). In this case, the predetermined account transfer process is requested to the server 50 of the bank in which the member has the account.

As described above, when the approval on the change in the amount is obtained from the member, the system of the embodiment starts the settlement (account transfer) process without reconfirming the member store (person in charge).

Consequently, the member store (person in charge) can omit the time required to confirm whether the approval on the modification in the order details is obtained from the member or not.

When the order details changing process is completed, the virtual shopping mall management server 10 transmits an e-mail indicating that the order has changed to the member terminal 30 and the member store terminal 40, and notifies the member and the member store of the change in the order (S650a1 and S650a2).

(3. Details of Processes performed by System of the Embodiment)

The details of processes performed by the virtual shopping mall management server in the system of the embodiment will be described by using the flowchart of FIG. 7 and pages and mails in FIGS. 8 to 12.

In the embodiment, a threshold (predetermined amount) as a criterion of a large change in an amount charged is set to "1,000 yen". The threshold can be properly changed.

In the following, the flow of processes performed by the virtual shopping mall management server will be described by using the flowchart of FIG. 7. In FIG. 7, numbers of other drawings to be referred to are shown. The processes whose reference numerals in FIGS. 6 and 7 are the same are the same processes.

(3-1. Acceptance of Order)

Figure 7:
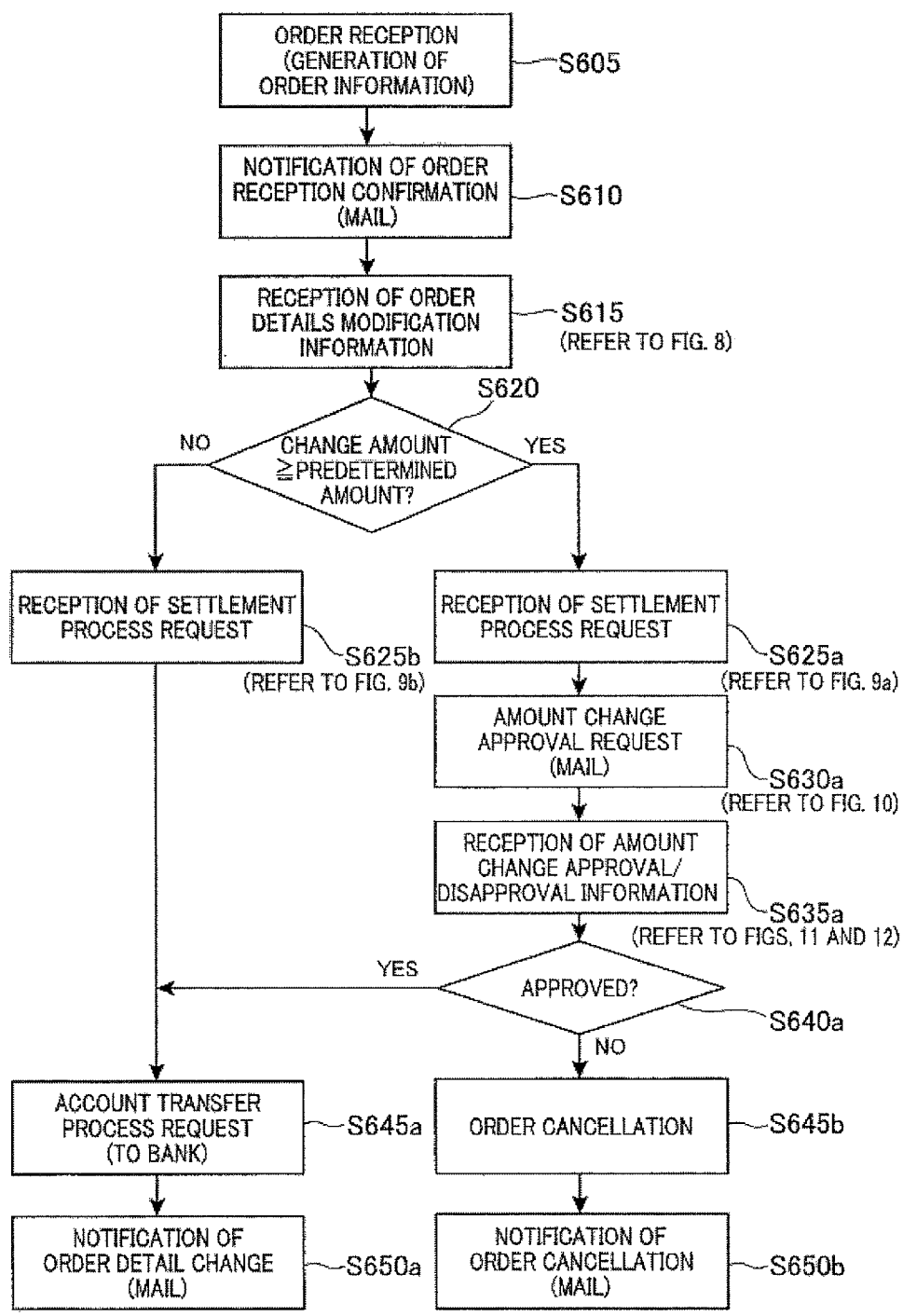
FIG. 7 is a flowchart showing the details of processes performed by a virtual shopping mall management server in the system of the embodiment.

As shown in FIG. 7, the virtual shopping mall management server 10 performs an order accepting process on the basis of information of a selected product and the like (S605). In this case, the virtual shopping mall management server 10 generates order information (refer to FIG. 5(d)) using the order number (the number given in S225 in FIG. 2) as a key and stores it in the order information database 14. An "order receiving process status" of order information is set as "new acceptance" of the initial value, and a "settlement process status" is set as "unprocessed" of the initial value.

On completion of the order accepting process, the virtual shopping mall management server 10 transmits an e-mail indicative of reception of the order to the member terminal 30 and the member store terminal 40 and notifies the member and the member store of acceptance of the order (S610). The e-mails to the member terminal 30 and the member store terminal 40 are transmitted almost simultaneously.

(3-2. Acceptance of Modification)

When the notification is received, the member store (person in charge) logs in the virtual shopping mall management server 10 by using the member store terminal 40, and requests for an order details confirmation page. When the confirmation page is requested by the member store terminal 40, the virtual shopping mall management server 10 transmits the order details confirmation page to the member store terminal 40 and asks the member store to confirm the order details. The member store (person in charge) confirms the order details on the received confirmation page and, as necessary, requests for an order details modification page.

When the modification page is requested from the member store terminal 40, the virtual shopping mall management server 10 transmits the order details modification page to the member store terminal 40, and accepts the order details modification information from the member store terminal 40 (S615). The member store (person in charge) enters a necessary modification in the modification page.

FIG. 8 illustrates an order details modification page. A modification page 800 is a page for individually confirming and modifying order details of the order number "123456-20070601-123456".

The modification page 800 includes an order details confirmation/modification column 810 and a button 820.

In the order details confirmation/modification column 810, order information corresponding to the order number is displayed. In this case, member information, product information, "quantity", "charge amount", and the like associated with the order information are displayed.

In the case where the order details are changed, the user enters changed content in a display column of an item to be changed, and clicks the button 820 displayed as "store this information".

Referring again to FIG. 7, when modification of the order details is received from the member store terminal 40, the virtual shopping mall management server 10 updates order information generated by the order accepting process (S605) on the basis of the received modification. Items "modification date and time", "modified amount", and "amount change approval flag" are added, and the "settlement process status" is changed to "waiting for transfer request". At this time point, the "amount change approval flag" is not set.

On the basis of the accepted modification information, the difference between the amount before a change and the amount after the change is calculated. Whether the difference becomes equal to or larger than a predetermined amount (1,000 yen) or not is determined (S620).

(3-3. Reception of Settlement Request)

When the difference between the amount before the change and the amount after the change is equal to or larger than the predetermined amount (1,000 yen) (Yes in S620), the virtual shopping mall management server 10 generates a settlement process request page, transmits it to the member store terminal 40, and asks the member store for a request for a settlement process (S625a). In the settlement process request page which is transmitted at this time, it is displayed that the member is notified of the request for approval on the amount change prior to the settlement process.

On the other hand, when it is determined that the difference before and after the change is not equal to or larger than the predetermined amount (1,000 yen) (No in S620), the virtual shopping mall management server 10 sets the "amount approval flag" of the order information, generates the settlement process request page, transmits it to the member store terminal 40, and demands the member store to ask for the settlement process (S625b). In the settlement process request page which is transmitted at this time, a message that the amount change approval request is notified of the member prior to the settlement process is not displayed.

FIG. 9(a) illustrates the settlement process request page transmitted to the member store terminal 40 when it is determined that the difference before and after the change is equal to or larger than the predetermined amount (1,000 yen).

A settlement process request page 900a includes an order information display column 910a and a button 920a for requesting the settlement process.

In the order information display column 910a, "order number" and "settlement process status" as order information to be subjected to the settlement process are displayed. By displaying an icon in a column 911a displaying "amount confirmation to user", a message indicating that a request for approval on a change in amount is notified to the member prior to the settlement process is displayed.

In the settlement process request page 900a, when the button 920a displaying "request for account transfer" is clicked, the virtual shopping mall management server 10 transmits an amount change approval request mail to the member terminal 30 as will be described later (S630a which will be described later).

FIG. 9(b) illustrates the settlement process request page transmitted to the member store terminal 40 when it is determined that the difference before and after the change is not equal to or larger than the predetermined amount (1,000 yen). A settlement process request page 900b is similar to the settlement process request page 900a except that no icon is displayed in a field 911b corresponding to the field 911a displaying "amount confirmation to the user".

When a button 920b displaying "request for account transfer" is clicked on the settlement process request page 900b, the virtual shopping mall management server 10 does not have to obtain approval on the amount change from the member, so that it immediately starts the settlement process (S645a which will be described later).

(3-4. Request for Approval)

Referring again to FIG. 7, in the case where it is determined that the difference before and after the change is equal to or larger than the predetermined amount (1,000 yen) (Yes in S620), on receipt of the settlement process request information from the member store terminal 40, the virtual shopping mall management server 10 transmits an e-mail indicative of acceptance of modification on order details causing a large change in the amount to the member terminal 30 and asks the member to approve the change in the amount (S630a). At this time the "settlement process status" of the order information is set to "unapproved".

Although the process is performed as a periodical batch process (for example, a batch process of every five minutes) in the embodiment, it may be performed at other timings.

Figure 10:
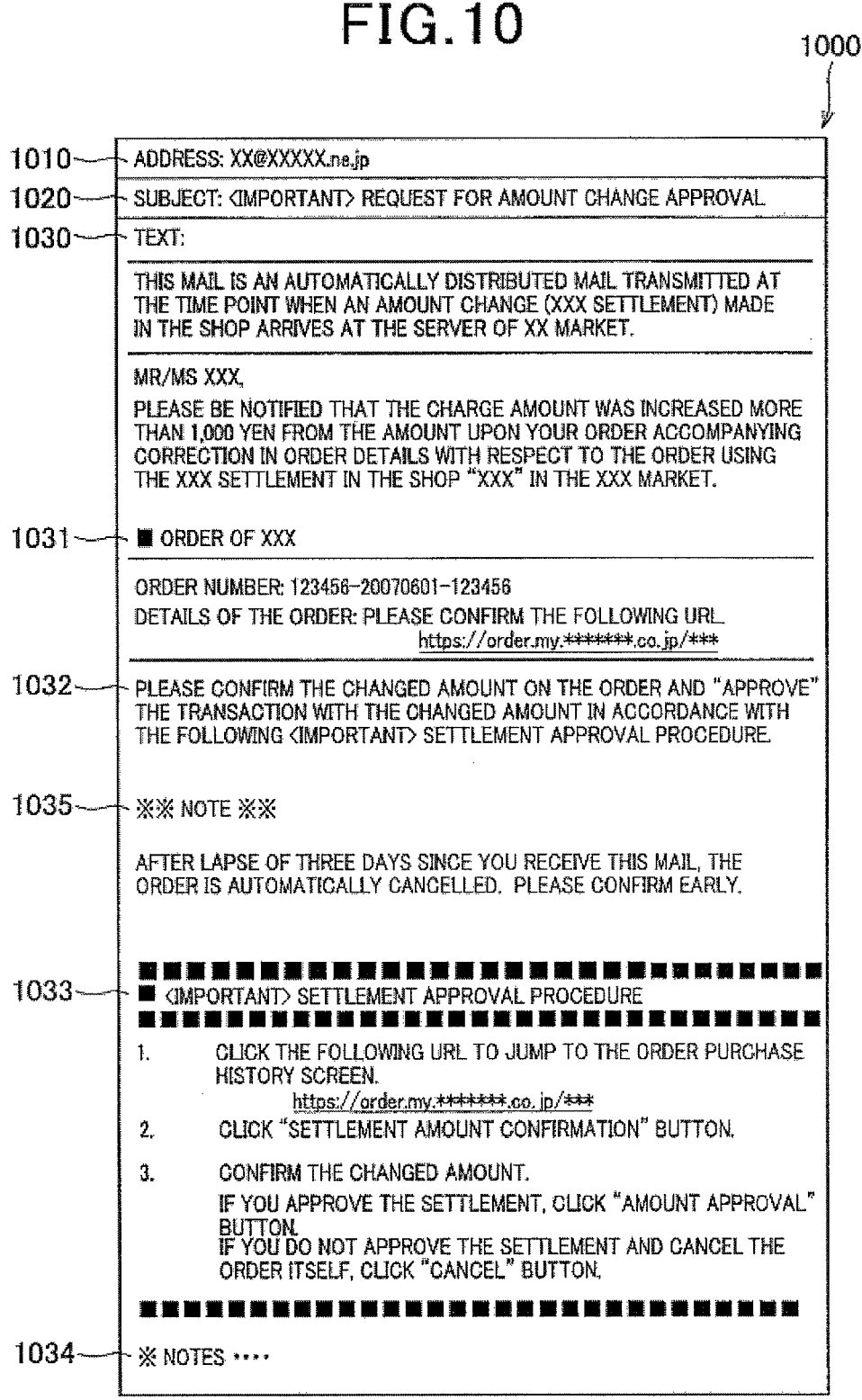
FIG. 10 is a diagram showing an example of a mail of requesting approval for a change in the amount of money.

FIG. 10 illustrates an amount change approval request mail. An approval request mail 1000 is transmitted to the member terminal 30 when the member store (person in charge) enters "2" in a quantity display field 811 in the modification page 800 (FIG. 8), clicks the button 820, and asks for the settlement process by clicking a button 920a displaying "ask for account transfer" in the transmitted settlement request page 900a (FIG. 9(a)).

In the approval request mail 1000, the mail address of the member terminal 30 is displayed in an address line 1010. The mail address is obtained from the member information associated with the order information. In a subject line 1020, a subject which is easily determined as an amount change approval request is displayed.

In a body line 1030, identification information (1031) of an order to be approved, approval request sentence (1032), approval procedure (1033), notes (1034) such as contact for inquiries, and the like are displayed. In the embodiment, a time limit (in this case, within three days since acceptance of modification) is set for approval on the amount change. A note such that when no approval is made within the time limit, the order is canceled is displayed (1035).

The URL displayed in "the details of the order" in the order identification information (1031) or (1) in the procedure (1033) of approval is a link to the confirmation page on the order as an object of request. Consequently, only by clicking the link on the member terminal 30, the member can receive the confirmation page on the order as an object of request.

Referring again to FIG. 7, the member who receives the request logs in the virtual shopping mall management server 10 by using the member terminal 30 and requests for a purchase history confirmation page. When the confirmation page is requested from the member terminal 30, the virtual shopping mall management server 10 transmits the purchase history confirmation page to the member terminal 30. The member confirms the order details on the purchase history confirmation page and requests for an amount change approval/disapproval selection page from the member terminal 30.

When the amount change approval/disapproval selection page is requested from the member terminal 30, the virtual shopping mall management server 10 transmits the amount change approval/disapproval selection page to the member terminal 30, and receives a response of approval or disapproval to the amount change from the member (S635a). The member confirms the modification content on the purchase history confirmation page and responds to approval/disapproval on the amount change.

FIG. 11 illustrates the purchase history confirmation page. A confirmation page 1100 is a page transmitted to the member terminal 30 when the URL displayed in "order details" in the order identification information (1031) in an approval request mail 1000 (FIG. 10) or in (1) in the approval procedure (1033) is clicked.

The confirmation page 1100 includes a display box 1110 of amount and the like, an order information display box 1120, and a button 1130 for requesting for an amount change approval/disapproval selection page.

In the display box 1110 of the amount and the like, product information, "quantity" of order information, "charge amount", and the like are displayed. In the order information display box 1120, not only "order number", "order date and time", and "settlement method" of the order information but also information of the person who ordered are displayed.

When the member clicks the button 1130 displaying "confirmation of settlement amount", the member terminal 30 requests the virtual shopping mall management server 10 for the amount change approval/disapproval selection page.

FIG. 12 illustrates the amount change approval/disapproval selection page. A selection page 1200 is a page transmitted to the member terminal 30 when the button 1130 is clicked in the confirmation page 1100 (FIG. 11).

The selection page 1200 includes a display box 1210 of the amount and the like, an amount approval button 1220a, and an order cancellation button 1220b.

In the display box 1210 of the amount and the like, the amount at the time of order, the amount after the change, and the difference are displayed. In the embodiment, when the difference is equal to or larger than the predetermined amount (1,000 yen), approval of the member is required.

When the member clicks the button 1220a of "amount approval", a response of approval to the amount change is transmitted from the member terminal 30 to the virtual shopping mall management server 10. On the other hand, when the member clicks the button 1220b of "cancellation", a response of disapproval to the amount change is transmitted from the member terminal 30 to the virtual shopping mall management server 10.

In the embodiment, the disapproval on the amount is handled as cancellation of the order, so that an option of disapproving only the amount change is not prepared.

(3-5. Cancellation of Request/Order of Account Transfer Process)

Referring again to FIG. 7, when a response is received from the member terminal 30, the virtual shopping mall management server 10 determines whether approval is obtained or not (S640a).

When it is determined that the response from the member terminal 30 is approval (Yes in S640a), the virtual shopping mall management server 10 determines that modification of order details is proper, determines the change in the order details, and requests the bank server 50 for the account transfer process (S645a).

In this case, the order information generated by the order accepting process (S605) is updated to the modified information, sets the "order receiving process status" to "waiting for shipment", and sets the "settlement process status" to "waiting for balance confirmation". In addition, the "amount change approval flag" is set.

When the change in the order details is determined, the virtual shopping mall management server 10 transmits an e-mail indicative of the order change to the member terminal 30 and the member store terminal 40 to notify the member and the member store of the fact that the order was changed (S650*a*). The notifications to the member and the member store are transmitted, for example, in a lump on the following day by a daily batch process.

On the other hand, when it is determined that the response from the member terminal 30 is disapproval (No in S640*a*), the virtual shopping mall management server 10 determines that the modification of the order details is not proper, and performs an order cancelling process (S645*b*). In this case, the "order receiving process status" of the order information generated by the order accepting process (S605) is set to "cancellation". The "amount change approval flag" is not set.

Also in the case where a response is not received from the member terminal 30 within a predetermined period (for example, three days), the virtual shopping mall management server 10 determines that the modification of the order details is not proper and performs the order cancelling process. In this case, the virtual shopping mall management server 10 searches the order information database 14 at the time of performing the daily batch process and reads order information which is modified but remains after lapse of the predetermined period without obtaining approval of the member (order information which lapsed the predetermined period since "modification date and time" from information in which "order receiving process status" is "waiting for shipment", the "settlement process status" is "unapproved", and the "amount change approval flag" is not set). The virtual shopping mall management server 10 performs a process similar to the order cancelling process (S645*b*) on the read order information.

After completion of the order cancelling process, the virtual shopping mall management server 10 transmits an e-mail indicative of cancellation of the order to the member terminal 30 and the member store terminal 40 (S650*b*). The notifications to the member and the member store are transmitted in a lump by the daily batch process on the following day.

Another Embodiment 1

In the foregoing embodiment, when the settlement process is requested from the member store, the process for obtaining approval from the member is performed for the following reason. After settlement is made via a settlement institute, after order details (charge amount) is changed, there is no chance to hold or refuse payment for the member. To safely make the settlement with the modified amount, the process of obtaining approval from the member in advance is effective.

Alternatively, when modification information on order details is received from the member store terminal 40, the process for obtaining approval from the member may be performed.

In this case, for example, in the processes shown in FIG. 7, when the order details modification information is received from the member store terminal 40 (S615) and it is determined whether the change amount between the charge amounts before and after the modification is equal to or larger than a predetermined amount (S620), without performing the process of accepting a request for the settlement process (S625*a*), an e-mail which requests approval of the amount change is transmitted to the member terminal 30 (S630*a*). In such a manner, when the order details modification information is received from the member store, the process for obtaining approval of the member can be performed.

<Another Embodiment 2>

In the foregoing embodiment, the case where the member terminal 30 or the member store terminal 40 is a terminal such as a personal computer is assumed. In the case where the member terminal 30 or the member store terminal 40 is a mobile terminal such as a cellular phone, a page or a mail different from that to the terminal such as a personal computer may be provided in accordance with the properties of the mobile terminal.

Figure 13:
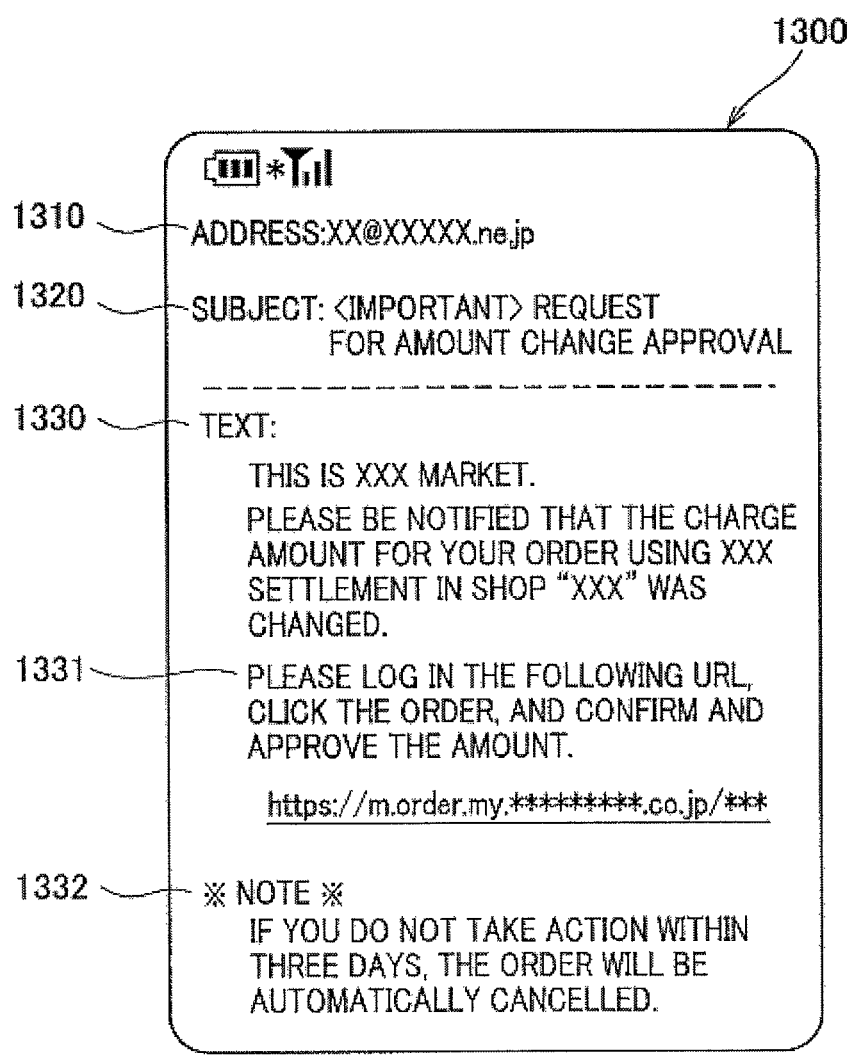
FIG. 13 is a diagram showing an example of a mail of requesting approval for a change in amount of money (to a mobile terminal).
Figure 14:
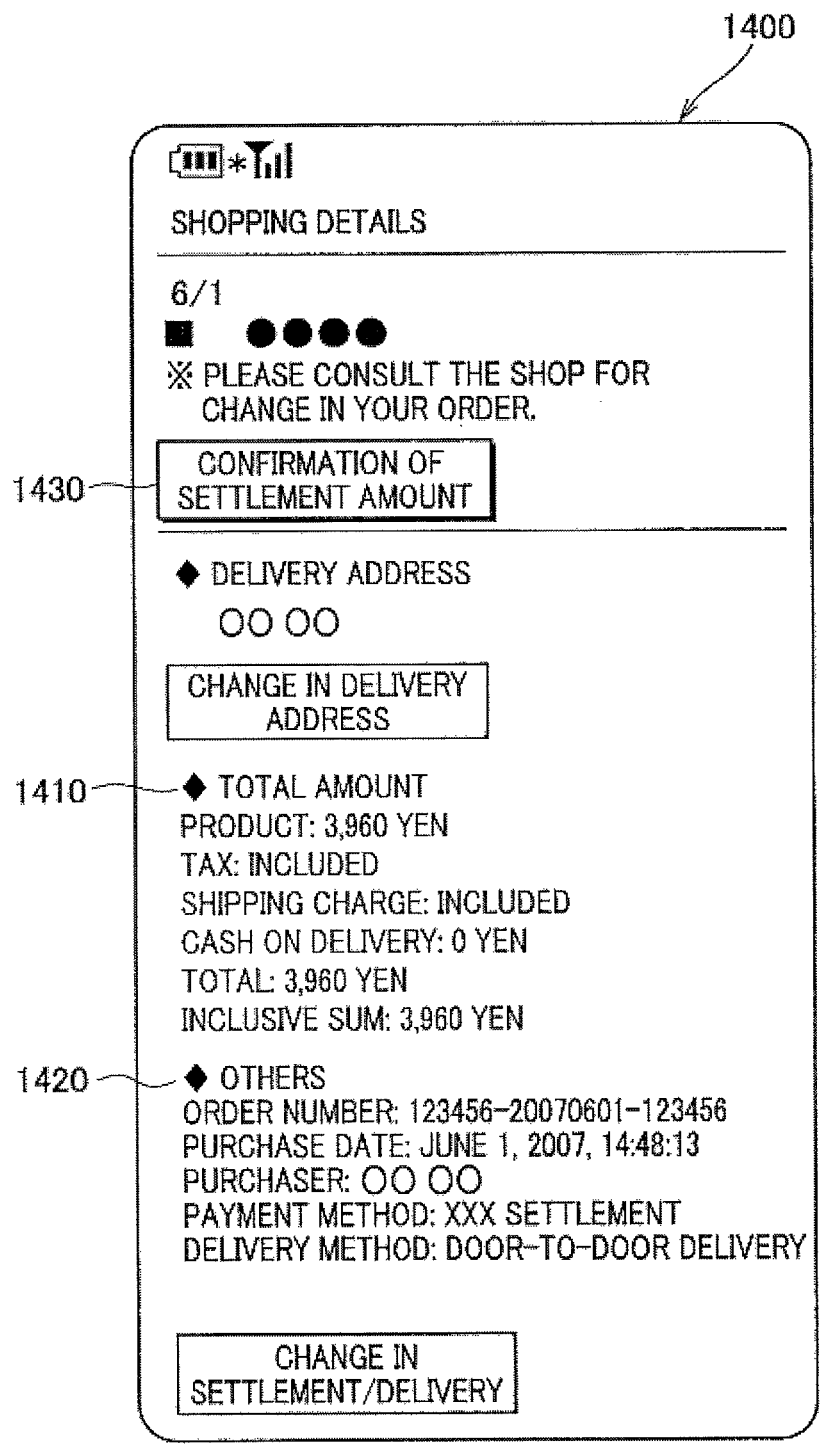
FIG. 14 is a diagram showing an example of a purchase history confirmation page (for a mobile terminal).
Figure 15:
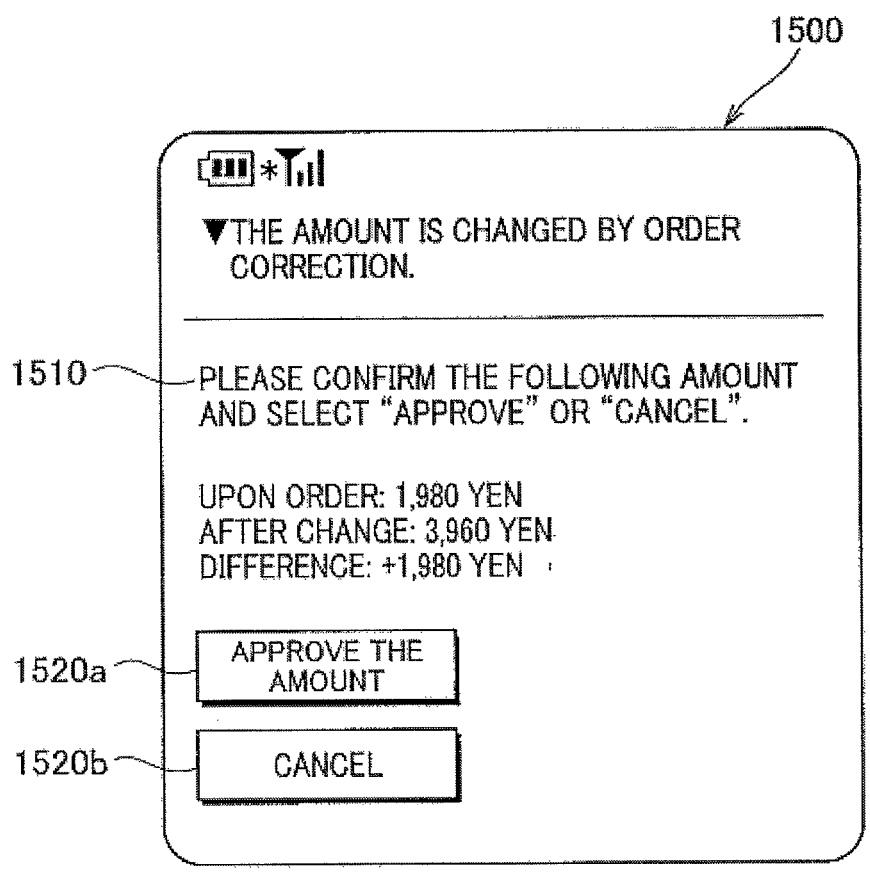
FIG. 15 is a diagram showing an example of a page of selecting approval or disapproval for a change in amount of money (for a mobile terminal).

Mails or pages illustrated in FIGS. 13 to 15 are more compact as a whole on precondition that the member terminal 30 or the member store terminal 40 is a mobile terminal such as a cellular phone.

FIG. 13 shows an amount change approval request mail to a mobile terminal. An approval request mail 1300 corresponds to the approval request mail 1000 (FIG. 10).

In the approval request mail 1300, the mail address of the member terminal 30 is displayed in an address line 1310. The mail address is obtained from the member information associated with the order information. In a subject line 1320, a subject which is easily determined as an amount change approval request is displayed.

In a body line 1030, an approval request sentence (1331) and a note (1332) such that when no approval is made within the time limit, the order is canceled are displayed.

The URL displayed below the approval request sentence (1331) is a link not to the confirmation page on the order as an object of request but to the top gage of the purchase history. When the link to the confirmation page on the order as an object of request is made, the URL is long.

FIG. 14 illustrates a purchase history confirmation page for a mobile terminal. A confirmation page 1400 corresponds to the confirmation page 1100 (FIG. 11). The confirmation page 1400 is a page transmitted to the member terminal 30, after completion of member authentication in a login page transmitted to the member terminal 30 by a click on the URL displayed below the approval request sentence (1331) in the approval request mail 1300, when a purchase history confirmation page related to an order as an object of the request is requested (refer to FIG. 13).

The confirmation page 1400 includes a display box 1410 of amount and the like, an order information display box 1420, and a button 1430 for requesting for an amount change approval/disapproval selection page.

In the display box 1410 of the amount and the like, product information, "charge amount", and the like of order information are displayed. In the order information display box 1420, not only "order number", "order date and time", and "settlement method" of the order information but also information of the person who ordered are displayed.

When the member clicks the button 1430 displaying "confirmation of settlement amount", the member terminal 30 requests the virtual shopping mall management server 10 for the amount change approval/disapproval selection page.

FIG. 15 illustrates the amount change approval/disapproval selection page. A selection page 1500 corresponds to the selection page 1200 (FIG. 12). The selection page 1500 is a page transmitted to the member terminal 30 when the button 1430 is clicked in the confirmation page 1400 (FIG. 14).

The selection page 1500 includes a display box 1510 of the amount and the like, an amount approval button 1520*a*, and an order cancellation button 1520*b*.

In the display box 1510 of the amount and the like, the amount at the time of order, the amount after the change, and the difference are displayed. In the embodiment, when the difference is equal to or larger than the predetermined amount (1,000 yen), approval of the member is required.

When the member clicks the button 1520*a* of "amount approval", a response of approval to the amount change is transmitted from the member terminal 30 to the virtual shopping mall management server 10. On the other hand, when the member clicks the button 1520*b* of "cancellation", a response of disapproval to the amount change is transmitted from the member terminal 30 to the virtual shopping mall management server 10.

In the embodiment, the disapproval on the amount is handled as cancellation of the order, so that an option of disapproving only the amount change is not prepared.

<Another Embodiment 3>

In the foregoing embodiment, when a request for the settlement process is received after modification on order details causing a large change in the charge amount is received, the virtual shopping mall management server 10 transmits the mail for requesting approval for the amount change only once to the member terminal 30. Alternatively, in the case where no response is received from the member terminal 30 within a predetermined period (for example, 24 hours), the mail for requesting approval for the amount change may be transmitted again to remind the member to approve the amount change. A "period as a reference for determining whether approval on an amount change is reminded or not in the case of no response" is set to be shorter than the "period as a reference for determining whether the order cancelling process is performed or not in the case of no response".

In this case, the virtual shopping mall management server 10 searches the order information database 14 at the time of performing the daily batch process and reads order information which is modified but is not approved by the member (order information which lapsed the predetermined period since "modification date and time" from information in which "order receiving process status" is "waiting for shipment", the "settlement process status" is "unapproved", and the "amount change approval flag" is not set). The virtual shopping mall management server 10 specifies the member who made the order from the read order information, and re-sends the mail of requesting approval on the amount change to the member terminal 30 of the specified member.

What is claimed is:

1. A virtual shopping mall management system for supporting a transaction between a member store in a virtual shopping mall and a member and performing a process of modifying order information, comprising:
   a modified information receiving unit that receives modified information on the order information from a terminal of the member store, after a notice of acceptance of the order information has been transmitted to a terminal of the member;
   a calculation unit that calculates a difference between a first charge amount before modification on the order and a second charge amount after the modification on the order;
   a change approval request mail transmitting unit that transmits an electronic mail for requesting approval of the modified information to the terminal of the member, when the difference between the first charge amount and the second charge amount exceeds a threshold amount, and omits transmission of the electronic mail for requesting approval of the modified information to the terminal of the member, when the difference between the first charge amount and the second charge amount does not exceed the threshold amount such that communication and processing load on a server of the virtual shopping mall management system is reduced;
   an approval/disapproval information receiving unit that receives approval information on the change from the terminal of the member; and
   an order determining unit that determines modification of the order information when the approval/disapproval information receiving unit receives approval information;
   wherein the virtual shopping mall management system, in response to the received approval information, automatically and directly requests a predetermined settlement institute, by bypassing any communication with the terminal of the member store, to perform a settlement process related to the transaction upon receiving approval information from the terminal of the member such that communication and processing load on the server of the virtual shopping mall management system is reduced,
   wherein when the order information is modified on a modification page at the terminal of the member store and a selection to store the modified order information is selected on the modification page. the virtual shopping mall management system transmits a settlement request page to the terminal of the member store to be displayed. and
   wherein when a selection requesting for the settlement process is selected on the settlement request page at the terminal of the member store, the change approval request mail transmitting unit transmits the electronic mail for requesting approval, when the difference between the first charge amount and the second charge amount exceeds the threshold amount, and the virtual shopping mall management system immediately requests the predetermined settlement institute to perform the settlement process without receiving the member's approval, when the difference does not exceed the threshold amount.

2. The virtual shopping mall management system according to claim 1, wherein when the approval/disapproval information receiving unit does not receive approval information or disapproval information within a predetermined period, the order determining unit cancels the order information.

3. The virtual shopping mall management system according to claim 2, wherein when the approval/disapproval information receiving unit does not receive approval information or disapproval information within a predetermined period, the change approval request mail transmitting unit re-transmits the electronic mail for requesting approval on said change to the terminal of the member.

4. The virtual shopping mall management system according to claim 1, wherein when the approval/disapproval information receiving unit does not receive approval information or disapproval information within a predetermined period, the change approval request mail transmitting unit re-transmits the electronic mail for requesting approval on said change to the terminal of the member.

5. The virtual shopping mall management system according to claim 1, wherein the change approval request occurs after an order has been previously approved.

6. A method of modifying order information in a virtual shopping mall management system for supporting a transaction between a member store in a virtual shopping mall and a member, comprising:

a modified information receiving step of receiving modified information on the order information from a terminal of the member store, after a notice of acceptance of the order information has been transmitted to a terminal of the member;

a calculation step of calculating a difference between a first charge amount before modification on the order and a second charge amount after the modification on the order;

a change approval request mail transmitting step of transmitting an electronic mail for requesting approval of the modified information to the terminal of the member, when the difference between the first charge amount and the second charge amount exceeds a threshold amount, and omitting transmission of the electronic mail for requesting approval of the modified information to the teinal of the member, when the difference between the first charge amount and the second charge amount does not exceed the threshold amount such that communication and processing load on a server of the virtual shopping mall management system is reduced;

an approval/disapproval information receiving step of receiving approval information on said change from the terminal of the member; and an order determining step of determining modification of the order information when approval information is received in the approval/disapproval information receiving step;

wherein the virtual shopping mall management system, in response to the received approval information, automatically and directly requests a predetermined settlement institute,by bypassing any communication with the terminal of the member store, to perform a settlement process related to the transaction upon receiving approval information from the terminal of the member such that communication and processing load on the server of the virtual shopping mall management systems is reduced, wherein when the order information is modified on a nodification olge at the terminal of the member store and a selection to store the modified order information is selected on the modification page, the virtual shopping mall management system transmits a settlement request page to the terminal of the member store to be displayed, and wherein when a selection requesting for the settlement process is selected on the settlement request page at the terminal of the member store, the change approval request mail transmitting step transmits the electronic mail for requesting approval, when the difference between the first charge amount and the second charge amount exceeds the threshold amount, and the virtual shopping mall management system immediately requests the predetermined settlement institute to perform the settlement process without receiving the member's approval, when the difference does not exceed the threshold amount.

7. A virtual shopping mall management system for supporting a transaction between a member store in a virtual shopping mall and a member, and performing a process of modifying order information, comprising:

a computer system including at least one processor programmed to:

receive modification information on an order from a member store terminal after a notice of acceptance of the order information has been transmitted to a terminal of the member;

calculate a difference between a first charge amount before modification on the order and a second charge amount after the modification on the order;

determine whether the modification information causes the difference to exceed a predetermined amount;

transmit an electronic message to a member terminal requesting approval of the modified information, when the difference between the first charge and the second charge amount exceeds a threshold amount, and omitting transmission of the electronic mail for requesting approval of the modified information to the terminal of the member, when the difference between the first charge amount and the second charge amount does not exceed the threshold amount such that communication and processing load on a server of the virtual shopping mall management system is reduced;

receive approval information from said member terminal for said cost;

modify said order based on said approval information; and in response to the received approval information, automatically and directly request a predetermined settlement institute. by bypassing any communication with the terminal of the member store, to perform a settlement process related to the transaction upon receiving approval information from the terminal of the member such that communication and processing load on the server of the virtual shopping mall management system is reduced, wherein when the order information is modified on a modification page at the terminal of the member store and a selection to store the modified order information is selected on the modification page, the virtual shopping mall management system transmits a settlement request page to the terminal of the member store to be displayed, and wherein when a selection requesting for the settlement process is selected on the settlement request page at the terminal of the member store, the at least one processor transmits the electronic mail for requesting approval, when the difference between the first charge amount and the second charge amount exceeds the threshold amount, and the virtual shopping mall management system immediately requests the predetermined settlement institute to perform the settlement process without receiving the member's approval when the difference does not exceed the threshold amount.

* * * * *